(No Model.)
G. GERDOM.
COMBINED SHAFT AND PULLEY BEARING.
No. 312,561. Patented Feb. 17, 1885.
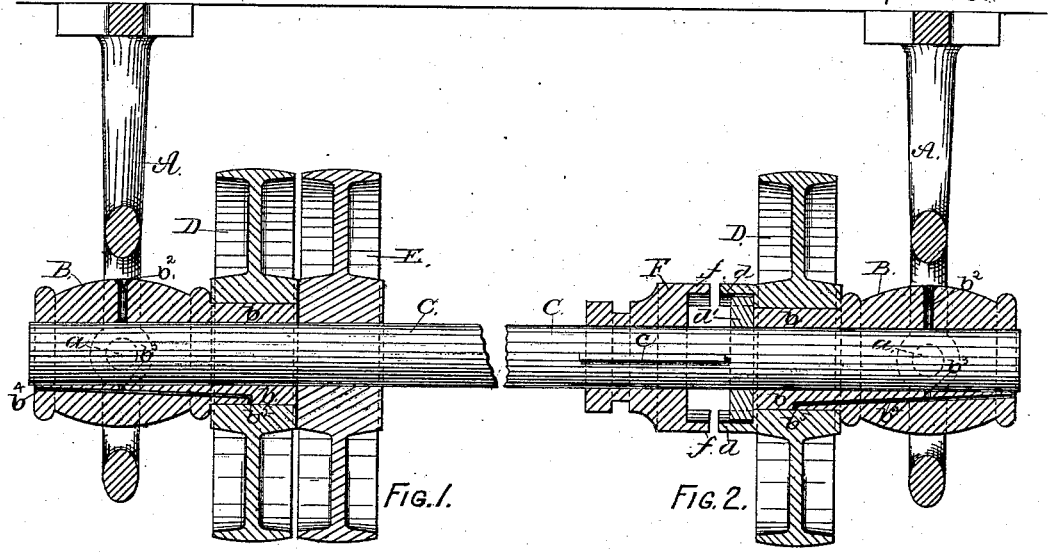
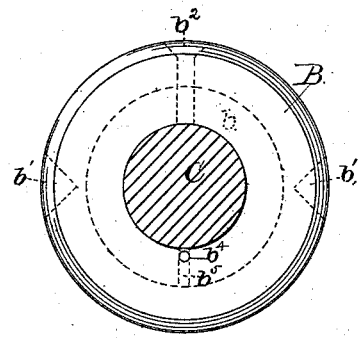
Fig. 3.
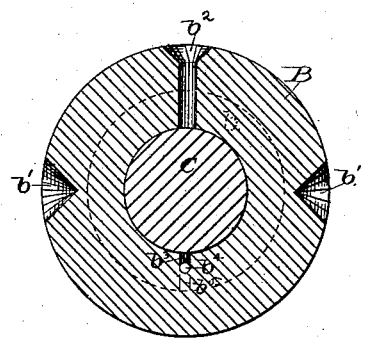
Fig. 4.
Witnesses:
S. B. Brewer
A. H. Scattergood
Inventor:
Gregory Gerdom,
by William H. Low,
Attorney.

UNITED STATES PATENT OFFICE.

GREGORY GERDOM, OF WEST TROY, ASSIGNOR OF ONE-HALF TO JOHN H. REYNOLDS, OF TROY, NEW YORK.

COMBINED SHAFT AND PULLEY BEARING.

SPECIFICATION forming part of Letters Patent No. 312,561, dated February 17, 1885.

Application filed July 30, 1884. (No model.)

*To all whom it may concern:*

Be it known that I, GREGORY GERDOM, of West Troy, in the county of Albany and State of New York, have invented certain new and useful Improvements in Combined Shaft and Pulley Bearings, of which the following is a specification.

My invention relates to a bearing for a shaft and for a loose pulley, the first of which rotates in the bore of the bearing, and the latter is fitted to rotate on a sleeve which forms part of the shaft-bearing. It also relates to an arrangement of oil-holes through which the bearings for the shaft and the pulley will be lubricated at the same time.

In the accompanying drawings, which form part of this specification, and are herein referred to, Figure 1 is a vertical section of a hanger provided with my bearing as adapted to use with a loose and tight pulley; Fig. 2, a like view adapted to a clutch-pulley; Fig. 3, an enlarged end elevation of the bearing detached from the hanger, and Fig. 4 a transverse section of Fig. 3 through the upper oil-hole.

As represented in the drawings, A is the hanger for carrying the shaft; B, the bearing or journal-box; C, the shaft; D, the loose pulley; E, the tight pulley, and F the clutch-coupling. The shaft-hanger A may be of any preferred form that is suitable for this purpose. The bearing B is preferably made of a single piece having a longitudinal hole that is bored to fit the shaft C. As shown in the drawings, said bearing is retained in the hangers A by means of set-bolts $a$, (indicated by the dotted lines of Figs. 1 and 2,) whose pointed ends fit into conical recesses $b'$, so as to permit the bearing to tilt when occasion requires to bring it to a true alignment. A sleeve, $b$, formed on one end of said bearing, is bored uniformly with the bearing, and forms part of the shaft-bearing. The outer circumference of the sleeve $b$ is turned to fit the bore of the loose pulley D, and forms a bearing for said pulley either to revolve upon or to remain at rest upon, as occasion requires. The upper oil-hole, $b^2$, is for the purpose of supplying the lubricant to the shaft-bearing. Directly under the oil-hole $b^2$ a second oil-hole, $b^3$, is made to lead from the bore of the bearing B into a longitudinal oil-channel, $b^4$, which is drilled in an inclined direction from the outer end of the bearing B to or near the middle of the sleeve $b$, at which point it connects with the oil-hole $b^5$, which opens on the under surface of the sleeve $b$. The oil-channel $b^4$ has a gradual descent from its opening at the end of bearing B to the point where it joins the vertical hole $b^5$, and by reason of this descent the oil entering said channel through the oil-hole $b^3$ from the bore of the shaft-bearing will naturally flow toward and out of the oil-hole $b^5$, where it will be utilized for lubricating bore of the pulley D. When required, oil may be injected in the open end of the oil-channel $b^4$ at the end of the bearing B. The loose pulley D is fitted to revolve on the sleeve $b$, whereon it is retained either by a tight pulley, E, as shown in Fig. 1, or by a collar, $d'$, secured to the shaft C, as shown in Fig. 2.

In the arrangement shown in Fig. 2 the loose pulley D is provided with projecting lugs $d$, which are adapted to engage with the lugs $f$, formed on a clutch-coupling, F, which is fitted to slide on the spline $c$ on the shaft C.

I claim as my invention—

The bearing B, having a longitudinal bore for receiving a shaft, and provided with a non-rotative sleeve, $b$, which forms a bearing for the pulley D, the said bearing also having in its upper part an oil-hole, $b^2$, and in its lower part the oil-holes $b^3$ and $b^5$ and oil-channel $b^4$, all being arranged in the manner and for the purpose herein specified.

GREGORY GERDOM.

Witnesses:
WM. H. LOW,
S. B. BREWER.